United States Patent [19]

Crook, Jr.

[11] 4,174,132

[45] Nov. 13, 1979

[54] MULTIPLE POSITION HOOK ASSEMBLY

[75] Inventor: Edward J. Crook, Jr., Tulsa, Okla.

[73] Assignee: American Hoist & Derrick Company, St. Paul, Minn.

[21] Appl. No.: 862,390

[22] Filed: Dec. 20, 1977

[51] Int. Cl.[2] .................... B64D 17/38

[52] U.S. Cl. .................... 294/83 R

[58] Field of Search .................... 294/83 R, 78 R, 82 R, 294/84, 83 AB; 248/339; 24/230.5 R, 241 R, 244 S, 241 PP, 241 SP

[56] References Cited

U.S. PATENT DOCUMENTS

| | | | |
|---|---|---|---|
| 3,575,459 | 4/1971 | Coblenz | 294/83 R |
| 4,073,531 | 2/1978 | Androski | 294/75 |

*Primary Examiner*—James B. Marbert

*Attorney, Agent, or Firm*—Burd, Braddock & Bartz

[57] ABSTRACT

A hook assembly usable with conventional load lifting equipment has a frame and a generally arcuate hook member pivotally assembled to the frame. Th hook member is rotatable relative to the frame between an open position for engagement of a load loop, such as a link or sling, a closed position to secure the load for handling, and a discharge position for dropping the load loop from the hook assembly. The frame has a contoured portion fashioned to cooperate with a hook member tip and body portion to define a closed, load retaining eye when the hook member is in the closed position, and an open, unobstructed throat when the hook member is in the open position. A releasable lock mechanism is assembled with respect to the frame and is operable to hold the hook member in an open position, to lock it in the closed position and to release to allow the hook member to move to the discharge position. The releasable lock mechanism includes a locking member fixed for guided movement relative to the frame. An interior end of the hook member has a plurality of projections defining bearing shoulders engageable with the locking member to lock the hook member in the selected open or closed position. Forces securing the locking member against unlocking are directly proportional to the load on the hook; and the hook member can be remotely released to drop the load loop by setting the load down at a remote location to remove the load from the hook.

25 Claims, 18 Drawing Figures

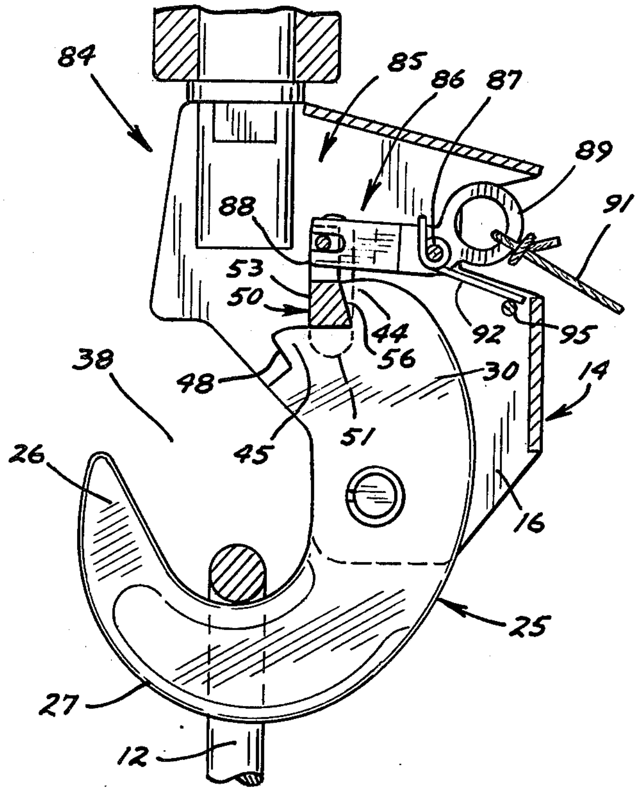
FIG. 9
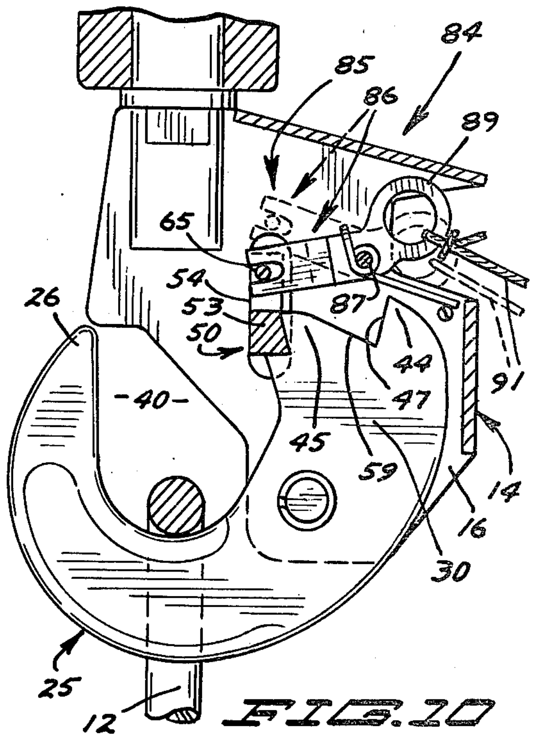
FIG. 10
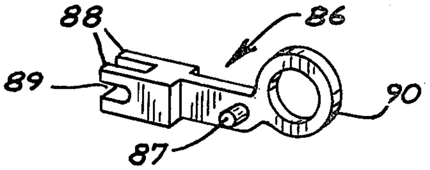
FIG. 11
FIG. 12
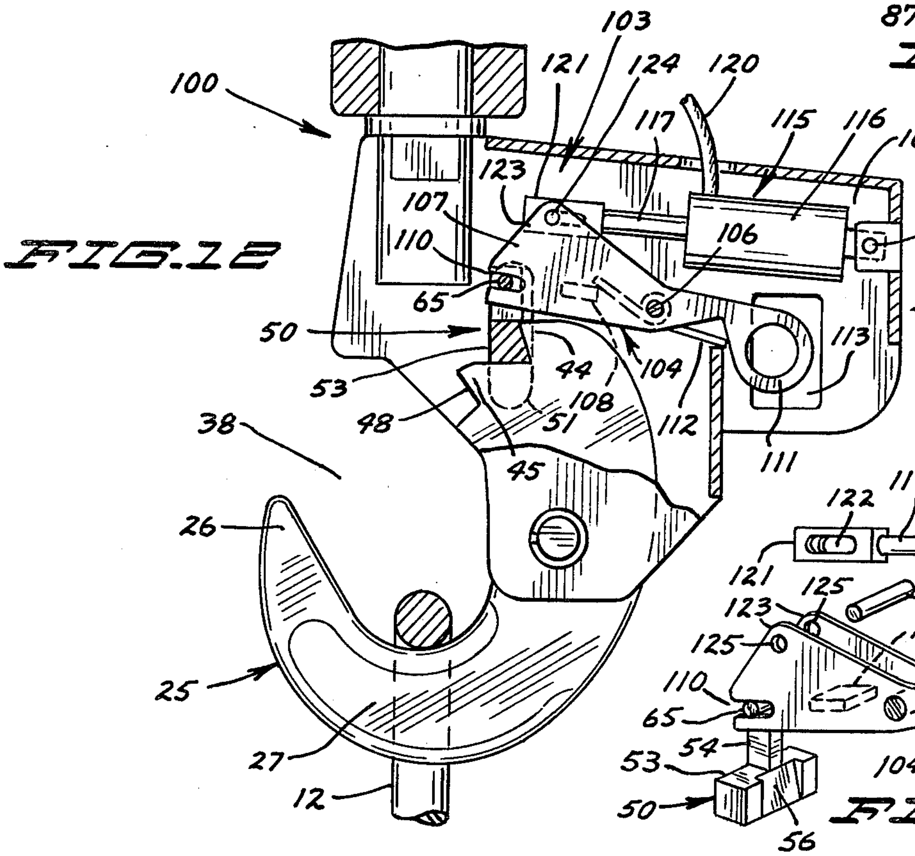
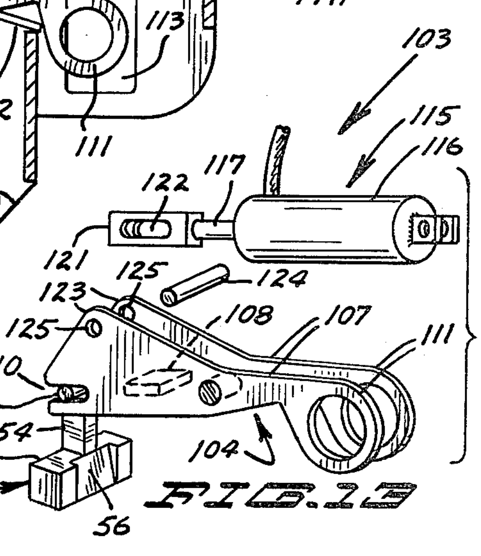
FIG. 13

FIG. 14
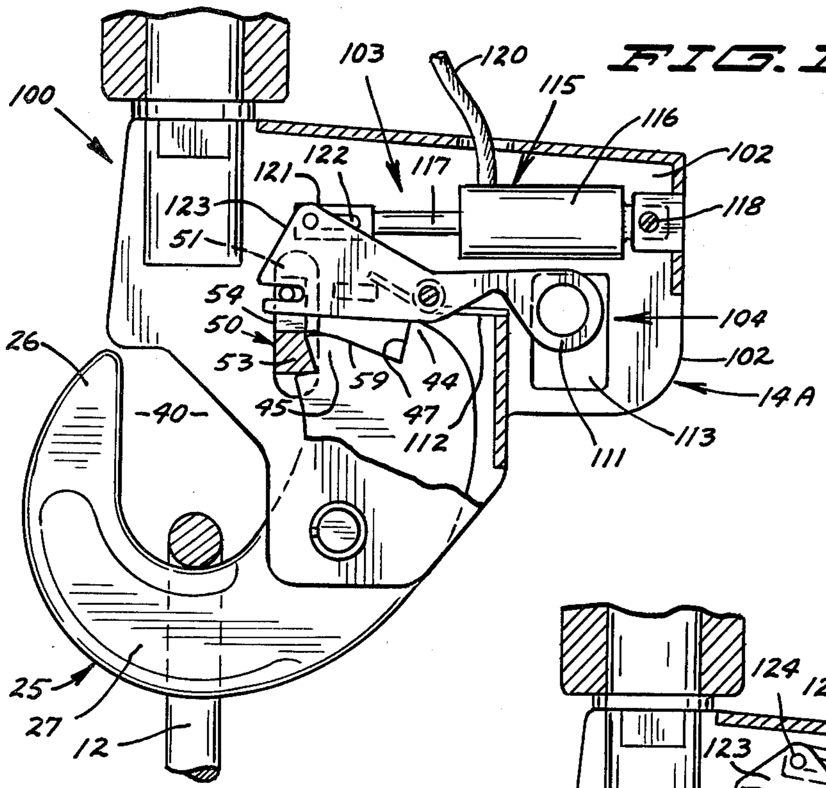
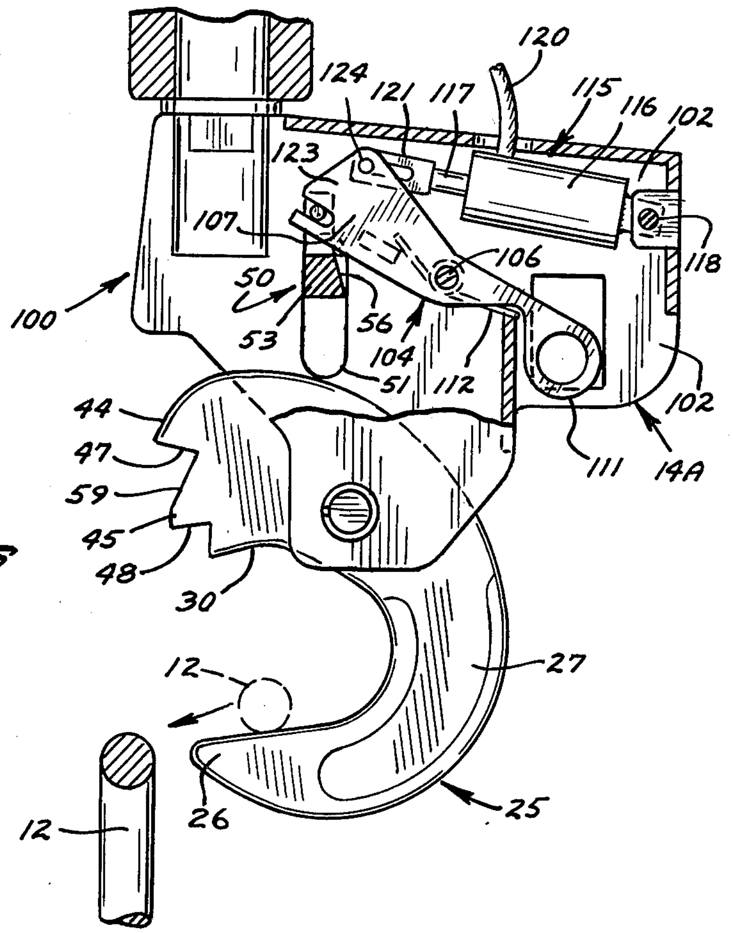
FIG. 15

MULTIPLE POSITION HOOK ASSEMBLY

BACKGROUND OF THE INVENTION

Load handling hooks for cranes and hoists and the like are frequently equipped with gates and latches to prevent accidental disengagement of the load carrying sling, chain or such from the hook. Typically, such gates are movable from a position in relatively clearing relationship to the hook throat to a position bridging the throat. See U.S. Pat. No. 3,674,301 to Crook issued July 4, 1972 and No. 3,575,458 to Crook et al issued Apr. 20, 1971. Frequently such gates render the hook throat partially obstructed in the open position, sometimes posing a difficulty when loading the hook. It is desirable that the hook throat be as clear as possible for loading. The strength of such latches is usually relatively moderate as compared to the strength of the hook and a danger of failure exists should the load on the hook be accidentally transferred to the safety gate or latch. In general, the strength of a latching mechanism should be compatible with the strength of the hook to optimize the hook-latch combination capability consistent with safety considerations.

In various hook gates and closures of the prior art, the weight of a load on the hook acts against the latch mechanism itself, i.e., the greater the load, the more stress placed tending to open the latch mechanism which, if failure occurs, results in opening of the hook. See U.S. Pat. No. 2,864,644 to Marryatt issued Sept. 30, 1957. It is desirable that a load on the hook not exert a force on the latch mechanism in a direction toward opening the latch and, indeed, it is preferable that the hook closure be devised such that increased loading on the hook is accompanied by an increase in the force holding the closure assembly closed.

A further requirement of a latch or hook closure mechanism is that it does not promote fouling of the load sling or load chain as by having parts protruding from the hook proximate the intended position of the load sling on the hook on which elements of the load sling or chain could catch and hang. For example, see U.S. Pat. No. 2,027,376 to Grau issued Jan. 14, 1936. An added requirement of the closure mechanism is that it be rugged so as to be usable out of doors exposed to the elements.

SUMMARY OF THE INVENTION

The invention relates to a hook assembly having a generally arcuate hook member pivotally assembled to a frame. The hook member has a tip end movable relative to the frame between a closed position defining with the frame and the rest of the hook a closed, load retaining eye, an open position providing an unobstructed hook throat for engagement and disengagement of a load, and a discharge position where any hook loop will fall by gravity from the hook.

A releasable lock mechanism associated with the frame serves to lock the hook member in open or in closed position and to release it from those positions to allow it to fall to discharge position. An interior portion of the hook has formed in it a plurality of discrete projections defining bearing shoulders. A locking member assembled to the frame is fixed for guided movement and has a lock bar movable into position to engage the bearing shoulders on the hook member to lock the hook member in position. The shoulders on the hook member are relatively located as to be engageable with the locking member when the free end of the hook is in predetermined position relative to the frame. With the hook member in the closed position, added loading on the hook member increases the bearing force between the locking member and a shoulder on one of the projections of the hook member. Means are provided for release of the hook member upon relaxation of the load by movement of the locking member out of engagement with the shoulder.

The hook member cooperates with a suitably contoured portion of the frame in forming the closed eye. In the open position, the throat of the hook member is unobstructed.

In the Drawings

FIG. 9 is a side elevational view of a hook assembly made according to a second embodiment of the invention with a hook member in an open position, and with parts in section and parts broken away;

FIG. 10 is a side elevational view of the hook assembly of FIG. 9 with the hook member in a closed position;

FIG. 11 is a perspective view of a lever member of the hook assembly of FIGS. 9 and 10;

FIG. 12 is a side elevational view partly in section of a hook assembly made according to a third embodiment of the invention with a hook member in an open position;

FIG. 13 is an exploded view of a releasable lock mechanism of the hook assembly of FIG. 12;

FIG. 14 is a side elevational view of the hook assembly as seen in FIG. 12 but with the hook member in a closed position;

FIG. 15 is also a side elevational view of the hook assembly as seen in FIG. 12 but with the hook member in a discharge position;

DESCRIPTION OF PREFERRED EMBODIMENTS

A. FIRST EMBODIMENT

Figure 1:
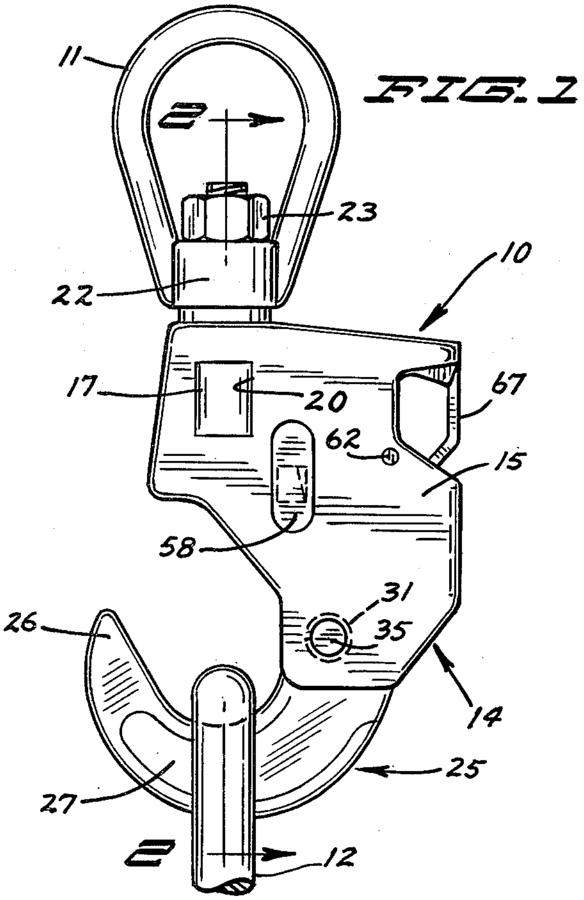
FIG. 1 is a side elevational view of a hook assembly made according to a first embodiment of the present invention, a hook of that assembly being in an open position, the assembly carrying a load loop and being assembled to an eye attachment of the type connectable to the load line of load lifting equipment.
Figure 2:
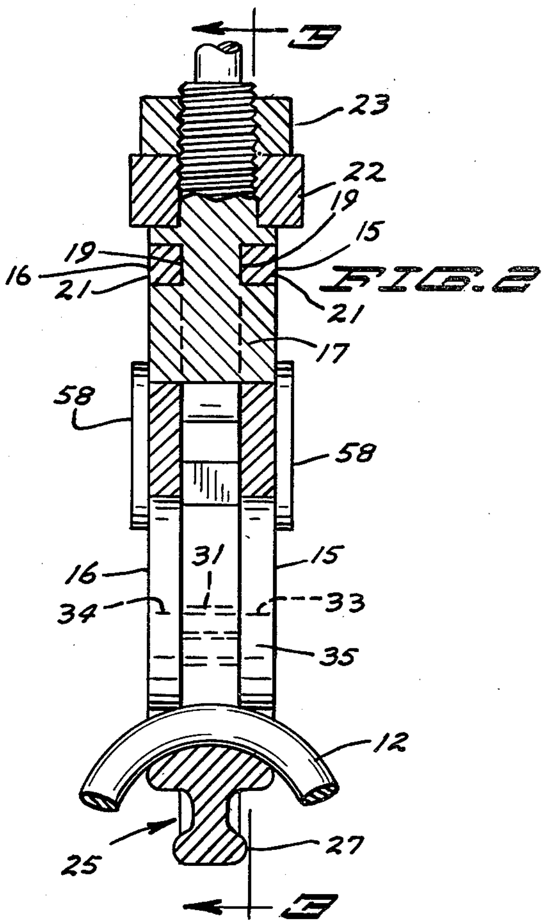
FIG. 2 is a sectional view of the hook assembly of FIG. 1 taken along the line 2—2 thereof.

In FIGS. 1 through 8, a hook assembly 10 made according to a first embodiment of the present invention is assembled to an eye attachment 11 and carrying a load loop partially shown at 12. Hook assembly 10 includes a frame 14 formed of a pair of mating, symmetrical side plates 15 and 16 connected to the lower end of a shank 17. A pair of oppositely disposed grooves 19,19 are provided in the shank 17 toward the lower end thereof. Each side plate, toward its upper edge, has a cut-out or opening 20. The lower end of shank 17 beneath grooves 19 is fitted in openings 20 provided in side plates 15 and 16, with upper portions 21,21 of side plates 15 and 16 above openings 20 fitted in the grooves 19 of shank 17, as best shown in FIG. 2. The side plates are welded to the shank. However, loading is transferred from the side plates to the shank through upper plate portions 21 and the shank portions in openings 20 and not through the welds. An upper end of shank 17 is threaded and extends through a base 22 of eye attachment 11. A nut 23 is threaded on the end of shank 17 to secure the shank to the eye attachment 11.

Eye attachment 11 is adapted for connection to a load line of a load handling machine such as a mobile crane, electric hoist, or the like. Hook assembly 10 is usable with such eye attachments as well as swivels, sheave blocks, overhaul balls, and the like. The hook assembly is usable also in secondary types of material handling apparatus as spreaders, slings, or the like.

An arcuate hook member 25 is pivotally assembled to the lower portion of frame 14 between the side plates 15 and 16. Hook member 25 is generally C-shaped, having a tip 26 at a free end thereof which extends into a curving, load bearing body portion 27 defining a hook bowl for accommodation of the load loop 12 connected to a load (not shown). As shown in FIG. 2, a typical cross section of body portion 27 is generally I-shaped for purposes of maximum strength with minimum weight. Body portion 27 of hook member 25 opposite tip 26 widens to an integral, interior, enlarged end portion 30 of hook member 25 (see FIG. 3).

One means for pivotally assembling a hook member 25 to frame 14 is shown in U.S. Pat. No. Re. 27,620 to Crook issued Apr. 17, 1973. A split locking sleeve 31 fits in a hole 32 provided in hook member 25 toward the interior end portion 30 thereof. In assembly, with locking sleeve 31 positioned in hole 32 of hook member 25, the hook member 25 is located between side plates 15 and 16 with hole 32 in alignment with matching holes 33,34 located in the lower portion of side plates 15 and 16, respectively. A pin 35 is inserted through the hole 33 of side plate 15 and is driven through the sleeve 31 and through the hole 34 of side plate 16. Split sleeve 31 has a natural diameter less than that of pin 35. Pin 35 is of sufficient diameter to expand split sleeve 31 in hole 32 of hook member 25 to an extent that it cannot move longitudinally through the holes 33,34 of the side plates. The outer ends of pin 35 are accommodated in the holes 33,34 of the side plates 15,16 to permit rotational movement of hook member 25 relative to the frame 14. The pin 35 and split sleeve 31 are firmly engaged in the hole 32 of hook member 25 for rotation therewith.

Figure 3:
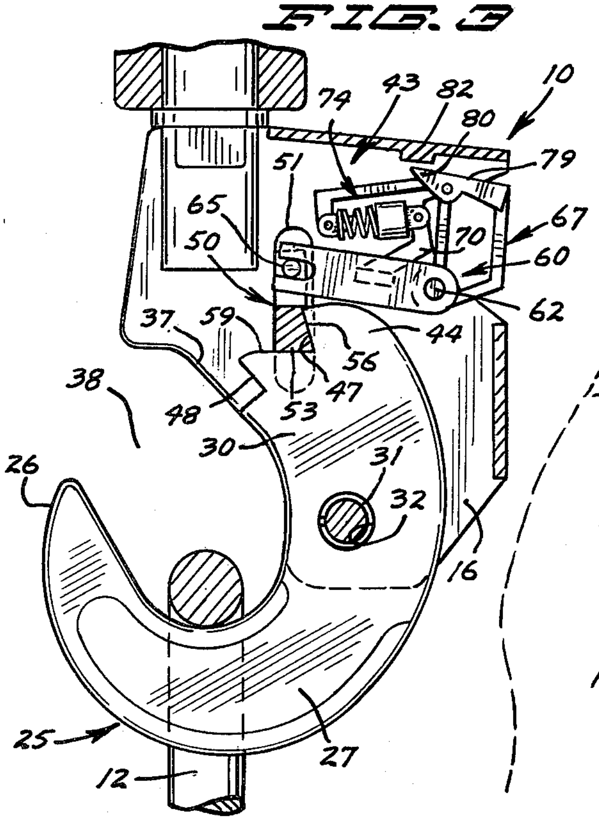
FIG. 3 is a sectional view of the hook assembly shown in FIG. 2 taken along the line 3—3 thereof.
Figure 4:
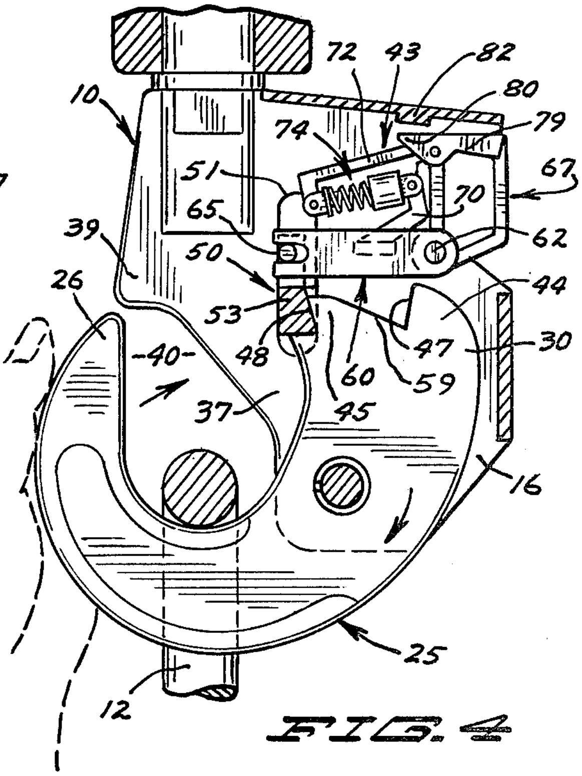
FIG. 4 is also a sectional view of the hook assembly taken on line 3—3 in FIG. 2 but showing the hook in a closed position.
Figure 5:
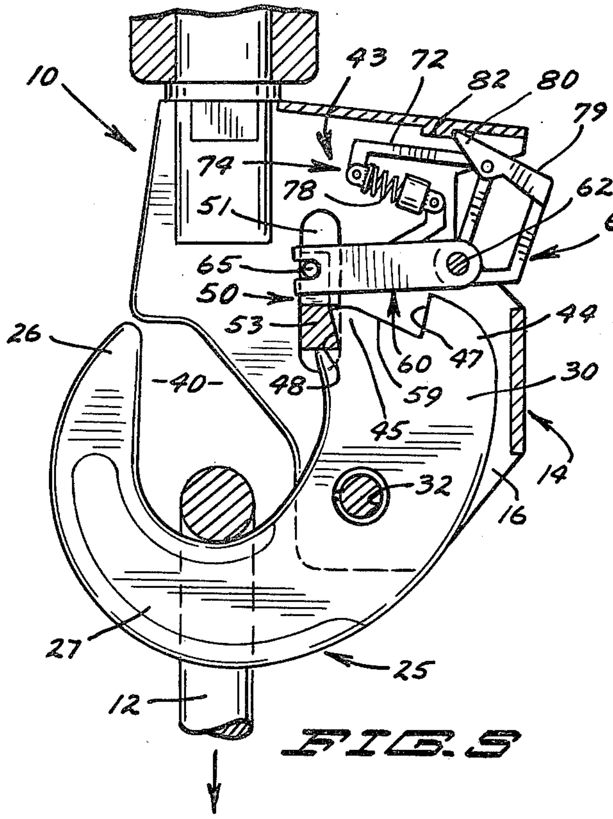
FIG. 5 is another sectional view of the hook assembly with the hook as seen in FIG. 4 but with a releasable lock mechanism in a cocked position.
Figure 6:
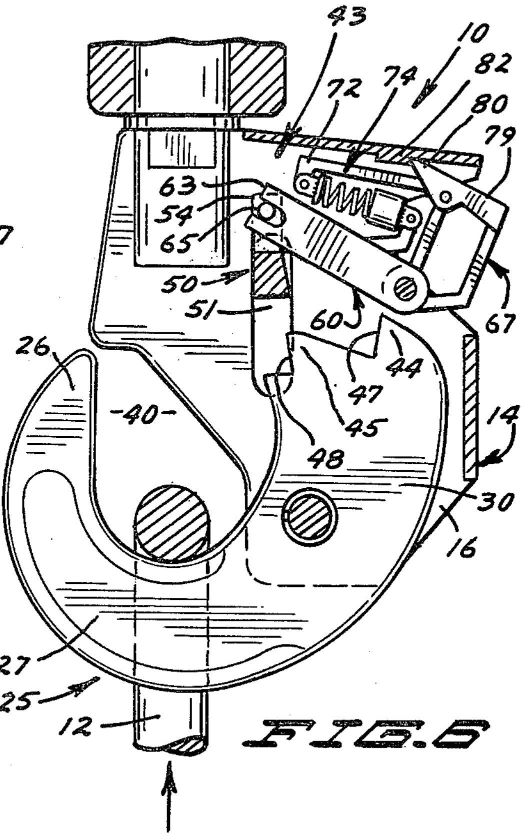
FIG. 6 is yet another sectional view of the hook assembly with hook as seen in FIGS. 4 and 5 but with the releasable lock mechanism in a release position.
Figure 7:
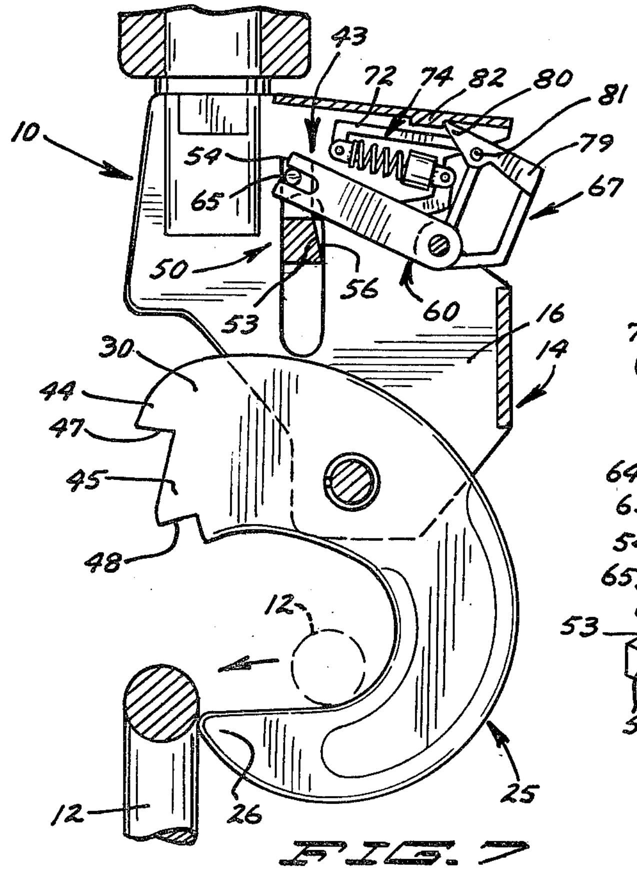
FIG. 7 is also a sectional view of the hook assembly taken on line 3—3 in FIG. 2 but with the hook member rotated to a discharge position.

Hook member 25 is rotatable with respect to frame 14 between an open position, as shown in FIGS. 1, 2 and 3, for engagement of a load; a closed position, as shown in FIGS. 4, 5 and 6 for securement of a load; and a discharge position, as shown in FIG. 7, for discharge of a load. A front lower portion 37 of frame 14 is inwardly and downwardly contoured, as shown in FIG. 3, whereby, in the open position, with the tip 26 of hook member 25 spaced from the frame there is formed an open, unobstructed throat 38. For closure, hook member 25 is rotatable to bring its tip 26 toward an intermediate corner 39 on Frame 14 adjacent the front lower portion 37 to form a virtually closed, load loop retaining eye 40.

A releasable lock mechanism, indicated generally at 43 in FIGS. 3 through 8, is assembled to frame 14 and is operable to hold the hook member 25 in the open position of FIGS. 1–3; to lock the hook member 25 in the closed position of FIGS. 4–6; and to permit full rotation of the hook member 25 to the discharge position shown in FIG. 7.

The interior end portion 30 of hook member 25 includes a first projection 44 and a second projection 45, together forming a shape somewhat like ratchet teeth. The first and second projections 44,45 are provided, respectively, with integral first and second shoulders 47,48.

Figure 8:
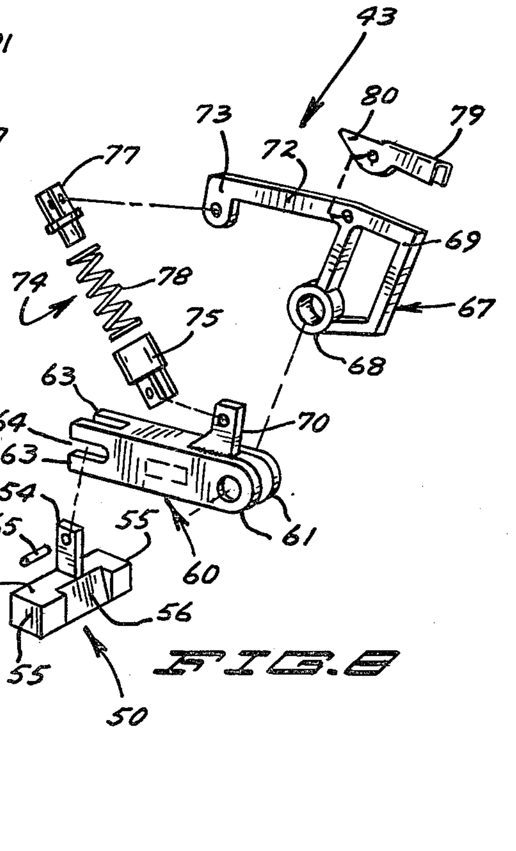
FIG. 8 is an exploded view of the releasable lock mechanism of the hook assembly of the foregoing figures.

Releasable lock mechanism 43 includes a locking member 50 assembled to the frame 14 and fixed for guided movement relative thereto. Side plates 15 and 16 are equipped with mating, normally vertical slots 51,51 disposed proximate the end portion 30 of hook member 25 when the hook member 25 is in the substantially upright orientation of FIGS. 3 and 4. As shown in FIG. 8, locking member 50 has a transverse lock bar 53 and an upstanding post 54 centrally extending from lock bar 53. Transverse ends 55,55 of lock bar 53 are generally rectangular and are adapted for engagement between the vertical sides of the slots 51,51. A bearing face 56 of lock bar 53 is beveled, as shown in FIG. 8, so that an imaginary plane including that face 56 passes to axis rotation of the hook member about pin 35 on the side thereof opposite the load bearing body portion 27.

Referring again to FIGS. 3 and 4, locking member 50 is assembled in frame 14 with transverse ends 55,55 slideably engaged in slots 51 of side plates 15,16 whereby the locking member 50 is vertically movable with respect to frame 14 guided by slots 51. As shown in FIG. 2, cover plates 58,58 welded to side plates 15 and 16, cover the slots 51 to prevent inadvertent jamming and to keep out dirt, foreign objects and the like. Bearing face 56 on lock bar 53 is located to go into opposing mating relationship to the shoulders 47,48 of projections 44, 45 of hook member 25. As shown in FIG. 3, bearing face 56 is engageable with the first shoulder 47 of first projection 44 to hold the hook member 25 in the open position relative to frame 14, for engagement of a load loop. Having engaged the load loop 12, hook member 25 is manually rotatable, as shown in FIG. 4, to a closed position. To reach this position, lock bar 53 travels over a ramp surface 59 between the shoulders 47,48 and finally drops or ratchets into bearing relationship to the second shoulder 48. The second shoulder 48 is relatively positioned such that this occurs when the tip 26 of hook member 25 has reached the closed position.

As previously noted, bearing face 56 on lock bar 53 is beveled presenting a planar surface disposed at an acute angle relative to the direction of movement of lock bar 53. The surface of bearing face 56 thus has a projection adapted to receive a force component acting in the direction of movement of lock bar 53 necessary to engage hook member 25. Shoulders 47,48 are angularly disposed on end portion 30 to match the bevel of bearing face 56 when in engagement with it. In the closed position of FIG. 4, and with a load engaged by the hook member, second shoulder 48 is in bearing engagement with bearing face 56 of lock bar 53. The force of the load is transmitted by the lock bar ends 55,55 to the side plates 15,16 by bearing against the edges of slots 51,51 in those side plates. A component of the force acts downwardly on lock bar 53 in direction of movement of lock bar 53 toward the locked position. Added increments of loading on the hook member 25 increase this downward component of force tending to maintain lock bar 53 in the locking position. Increasing load thus renders it more difficult to disengage the lock bar. This effectively renders the lock mechanism self-locking because lock bar 53 cannot be disengaged until the load upon hook member 25 is relieved.

Releasable lock mechanism 43 provides means for release of locking member 50 for return of the hook member 25 to the open position of FIG. 3 and additionally, means for remote discharge of a load by permitting the hook member 25 to assume a relatively inverted discharge orientation, as shown in FIG. 7. Actuator means include a lever member 60 having a pivoted end with bifurcations 61,61 (shown in FIG. 8) rotatably mounted on a pivot pin 62 secured to the frame 14. Referring to FIGS. 3, 4 and 8, a free end 63 of lever member 60 is also bifurcated to straddle the post 54 of locking member 50 extending from lock bar 53. Each bifurcation of free end 63 has an end slot 64. With the bifurcations of the free end 63 straddling the post 54, a transverse pin 65 is inserted through the end slots 64 and through a suitably provided hole located in the post 54, thereby assembling locking member 50 for movement with the free end 63 of lever member 60.

A handle 67 has a generally rectangular part 69 and a boss 68 at a corner thereof which fits between the bifurcations 61,61 of the fixed end of lever member 60, being rotatably mounted on the same pivot pin 62 and rotatable relative to lever member 60. The generally rectangular part 69 of handle 67 is conveniently engageable by the fingers of an operator's hand. An ear 70 projects upwardly from lever member 60 intermediate the ends thereof. Extending away from the rectangular part 69 of handle 67 is an integral arm 72 having an outer end 73 spaced from the ear 70 of lever member 60. Fixed between the end 73 of arm 72 and the ear 70 of lever member 60 is a compression spring assembly 74. Spring assembly 74 includes a cup 75 pivotally connected to the ear 70, and a plug 77 pivotally connected to the end 73 of arm 72. A compression coil spring 78 has one fitted in the cup 75 and is engaged at the opposite end by the plug 77. Upon relative rotation of the end 73 of arm 72 of handle 67 toward the ear 70 of lever member 60 and about pivot pin 62, a compressive force is established by compression spring assembly 74.

A latch piece 79 has a latch tooth 80 and is pivotally connected to handle 67 as at 81. Latch tooth 80 is pivotal into and out of latching engagement with an abutment 82 on frame 14.

Viewing FIGS. 3 through 8, the operation of hook assembly 10 may be fully appreciated. With the hook member 25 in the open configuration of FIG. 3, a load loop 12 is inserted through the unobstructed throat 38 to rest in the bowl of load bearing body portion 27. Load loop 12 can be a load link, a sling, or any of the like assorted devices used in conjunction with the lifting of loads.

Hook member 25 is then manually rotated to the closed position of FIG. 4. In closing the hook member 25, the lock bar 53 moves from a position in engagement with the shoulder 47 of the first projection 44 to a position in engagement with the second shoulder 48 of the second projection 45, as previously described. The lock bar 53 travels over the ramp surface 59 separating the shoulders 47,48 and ratchets into position relative to the second shoulder 48. Under gravitational influence, lock bar 53 drops into place relative to the second shoulder 48 or it can be spring assisted. With the hook assembly in the configuration of FIG. 4, the eye attachment 11 and hook assembly 10 are elevated so that the load on loop 12 is lifted on hook member 25. As increasing load is applied to the hook member 25, a force component is generated to maintain the hook assembly locked as set out above. The hook assembly 10 cannot be opened again until the load on hook member 25 is relieved as by setting the load on loop 12 down.

The hook assembly is opened for disengagement of load loop 12 by exertion of outward force on handle 67. By design, the compressive force necessary to compress spring assembly 74 is greater than that force component exerted by unloaded load loop 12 on hook member 25 that is transmitted to compression spring 78. Force exerted on the handle 67 thus acts through the ear 70 to rotate lever member 60 and lift lock bar 53 of locking member 50 out of engagement with the second shoulder 48 to an elevation where it may engage the first shoulder 47. First projection 44 extends further from end portion 30 than second projection 45. Thus first shoulder 47 is engageable with lock bar 53 at a higher elevation in slots 51 than the second shoulder 48. Under the weight of load loop 12, hook member 25 rotates to the open position from further rotation by engagement of lock bar 53 and first shoulder 47.

Releasable lock mechanism 43 can be set for remote and automatic discharge of load loop 12 and the accompanying load. This is necessary or desirable when a load is to be deposited where it is impossible or inconvenient to have a person located. Load loop 12 is engaged and hook member 25 is moved to the closed position according to the procedure described relative to FIGS. 3 and 4. A substantial force is placed on hook member 25 beyond the weight of load loop 12 as by commencing to lift the load on the loop.

Releasable lock mechanism 43 is then cocked by manually rotating handle 67 outwardly to a position where the latch tooth 80 of latch piece 79 is brought into engagement with the abutment 82 on the frame 14, as shown in FIG. 5. Movement of the handle 67 is against the compressive force of spring assembly 74, compressing the spring 78, as shown. A force is established between the handle 67 and the lever member 60 via arm 72 of handle 67, spring assembly 74 and ear 70 of lever member 60. This force is less than the force component exerted on the spring assembly due to the load carried by hook member 25, but greater than the same component of force when caused by the weight of hook member 25 and load loop 12 alone.

The load can then be moved to the desired remote location with realization of the aforementioned advantages. The load is set down at the remote location and as this is done, the force exerted on hook member 25 is relieved. As the force on hook member is reduced to a value approaching the weight of load loop 12 alone, the energy stored in compressed spring assembly 74 exceeds the force component acting on the spring assembly due to the load on the hook. Since rotation of handle 67 is restricted by latch piece 79, spring assembly 74 forces rotation of lever member 60 to move locking member 50 out of engagement with shoulder 48 against the weight of load loop 12. Locking member 50 is moved upward in the slots 51,51 to a position of clearing relationship to both the second projection 45 and the first projection 44, as shown in FIG. 6. In such a configuration, hook member 25 is free to rotate under the influence of the weight of load loop 12 and its own weight and does so rotate as shown in FIG. 7 to a relatively inverted position until the load loop slides off the hook member 25. Hook assembly 10 is then available for resetting and engagement of another load.

B. SECOND EMBODIMENT

Referring to FIGS. 9, 10, 11, 12 and 13, a hook assembly 84 is shown in accordance with a second embodiment of the present invention. In hook assembly 84, frame 14, hook member 25 and locking member 50 are substantially identical to the hook assembly 10 earlier described. The same reference numerals are applied to identify the components of those parts which are the same as those of hook assembly 10.

A hook member 25 is pivotally assembled to a frame 14 and has a tip 26, a body portion 27, and an interior end portion 30. First and second projections 44,45 extend from end portion 30 and have integral first and second shoulders 47,48 for engagement with lock bar 53 of locking member 50.

A releasable lock mechanism 85 of hook assembly 84 includes not only locking member 50 accommodated by slots 51 in frame slide plates 15 and 16, but also a lever member 86 pivotally mounted on a pivot pin 87 secured to frame 14. One end of lever member 86 has bifurcations 88, as shown in FIG. 11, which straddle a post 54 extending from a lock bar 53 of locking member 50. The bifurcations 88 have end slots 89 which engage pin 65, thereby assembling locking member 50 for movement with the end of lever member 86. At the opposite end of lever member 86 is an integral handle 90 which can be engaged by the finger of an operator or by a line such as the line 91 for remote actuation. A linear torsion spring 92 surrounds pivot pin 87 and has one end bearing against an upper edge of lever member 86, and the other end bearing against a projection 95 suitably provided on frame 14. Spring 92 serves to bias the bifurcated end of lever member 86 downward to also bias locking member 50 downward relative to the slots 51,51.

In use of the hook assembly 84, with the hook member 25 in the open position of FIG. 9, load loop 12 is engaged in the bowl defined by body portion 27, having passed through unobstructed throat 38. Lock bar 53 bears against the first shoulder 47 securing hook member 25 from further rotation in the open position.

To close the hook assembly, hook member 25 is manually rotated toward the frame 14. Lock bar 53 travels over the ramp surface 59 separating the first and second projections 44, 45. Upon further rotation of hook member 25, locking member 50 is ratcheted under the influence of spring 92 into position relative to the second shoulder 48. See FIG. 10. Bearing face 56 of lock bar 53 bears against the shoulder 48. Increased loading on hook member 25 is accompanied by an increased force between bearing face 56 and shoulder 48, which force has a downward component rendering the hook assembly 84 self-locking.

At such time as it is desirable to open the hook for disengagement of the load loop 12, unless the load is relatively light, it is first set down for relaxation of the force on hook member 25. Handle 90 is engaged for rotation of the bifurcated end of lever member 86 to move lock bar 53 out of engagement with shoulder 48 against the weight of the hook member and of load loop 12. This is accomplished by digital engagement of handle 90 or by pulling on line 91 attached to the handle. When the lock bar 53 is clear of the shoulder 48, hook member 25 rotates to the open position to a point where the lock bar 53 engages the first shoulder 47.

C. THIRD EMBODIMENT

Referring to FIGS. 12 through 15, in a third embodiment of the invention, a hook assembly is indicated generally at 100. Hook assembly 100 has hook member 25 and locking member 50 substantially identical to those previously described. Other similar parts are again referred to by the same numerals. Frame 14A is substantially identical to frame 14 but with the addition of rearward extensions 102,102 of the side plates 15 and 16 to accommodate additional structure.

A releasable lock mechanism 103 has a lever member 104 pivotally mounted on a pivot pin 106 secured to frame 14A. Referring to FIG. 13, lever member 104 includes a pair of parallel lever arms 107,107 connected by a block 108. At one end of lever member 104, the lever arms 107,107 straddle a post 54 of locking member 50. The ends of lever arms 107,107 have slots 110 which engage a pin 65 in post 54, thereby assembling the locking member 50 for movement with the end of lever member 104. At the opposite end of lever member 104, each lever arm 107,107 has an integral handle 111 which is engageable by the fingers of an operator through openings 113 in side plates 102. In assembled relationship to the frame 14A, a linear torsion spring 112 surrounds pivot pin 106, having one end bearing against a block 108 and the opposite end bearing against a portion of frame 14A to bias the slotted end of lever member 104 and hence locking member 50 downward relative to the slots 51.

As thus far described, hook assembly 100 is functionable in the same fashion as hook assembly 84 shown in FIGS. 9 and 10. Hook member 25 is movable from the open position of FIG. 12 to the closed position of FIG. 14, the movement of the locking member 50 being as previously described. In addition, however, hook assembly 100 is equipped with power means for the selective remote actuation of releasable lock mechanism 103. A power unit or linear motor 115 is shown comprised of a hydraulic cylinder 116 and a piston rod 117 extendible and retractible relative to the hydraulic cylinder. Linear motor 115 could as well be a pneumatic power unit, electric solenoid, or other such linear motor or other powered device having a movable rod, shaft, plunger, or the like. One end of cylinder 116 is pivotally mounted as at 118 to the frame 14A. Hydraulic fluid is delivered to the cylinder through a suitable hydraulic fluid line 120 from a remote source. The outer end of rod 117 is equipped with an elongate block 121 having an elongate slot 122. The ends of lever arms 107,107 in engagement with locking element 50 have enlarged sections 123,123 with holes 125 for accomodation of a pin 124. In assembled relationship, pin 124 is assembled between the sections 123,123 of lever arms 107,107 and is engaged in the slot 122 of elongate block 121. Thus retraction of rod 117, it may be seen, is effective to pivot lever member 104 moving the end of lever member 104 in engagement with post 54 of locking member 50 upward to move locking member 50 upward relative to the slots 51.

In use of the hook assembly 100, with the hook member 25 in the open position of FIG. 12, load loop 12 is engaged in the bowl defined by body portion 27. Lock bar 53 bears against the first shoulder 47 securing hook member 25 from further rotation in the open position. The hook assembly is closed as previously described, achieving the configuration of FIG. 14, and realizing the aforementioned advantages. The hook assembly is opened upon relaxation of the load upon hook member 25 and actuation of handle 111 of lever member 104 to move the lock bar 53 out of engagement with the second shoulder 48 and into engagement with the first shoulder 47.

Alternatively, the load may be discharged from the hook assembly at a remote location. This is accomplished by remote actuation of power unit 115 to retract rod 117 relative to the cylinder 116. This pivots lever member 104 and raises locking member 50 relative to slots 51,51. The locking member 50 is raised to a position in clearing relationship to both the projections 44 and 45. This allows hook member 25 to rotate under the influence of the weight of load loop 12, in a counterclockwise direction as shown in FIG. 15, to a point where the load loop slides out of hook member 25. There are no obstructions or the like on hook member 25 which would foul or prevent disengagement of load loop 12. Hook member 25 may be reset following relaxation of the hydraulic pressure delivered to power unit 115.

D. FOURTH EMBODIMENT

Figure 16:
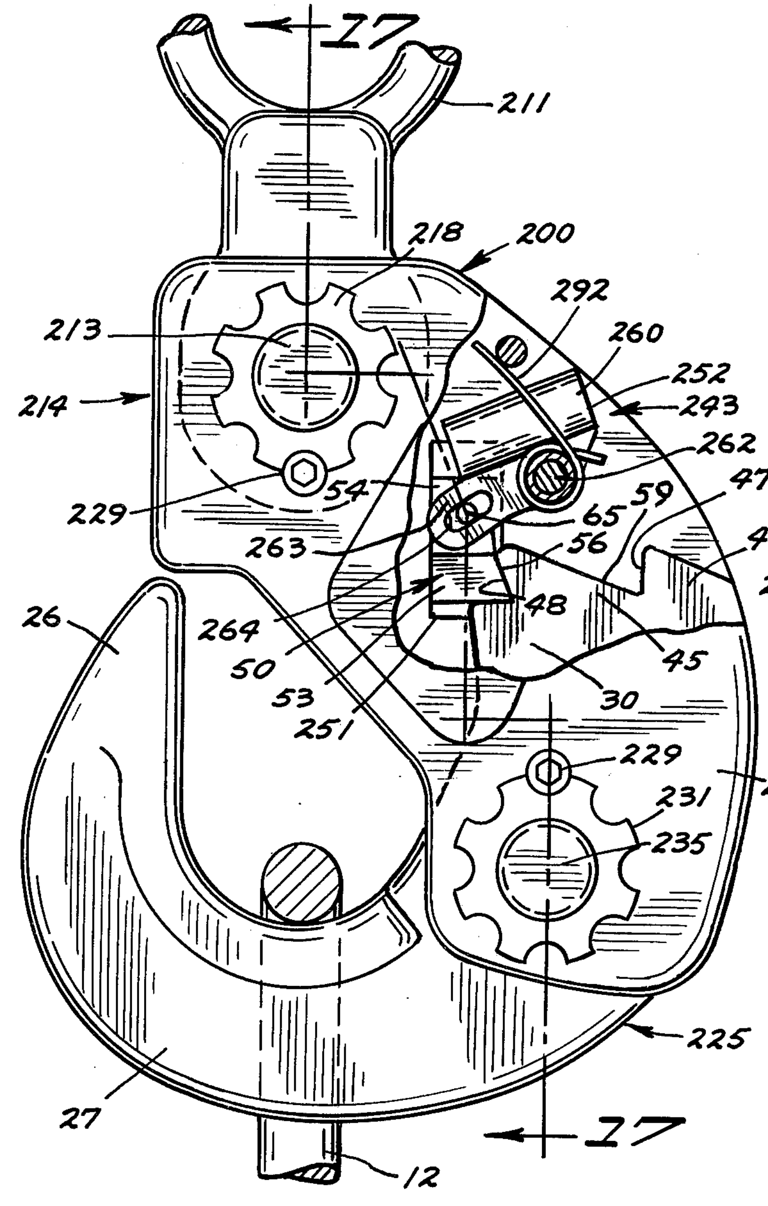
FIG. 16 is a side elevational view with parts in section and parts broken away, of a hook assembly made according to a fourth embodiment of the invention and showing a hook member in a closed position.
Figure 17:
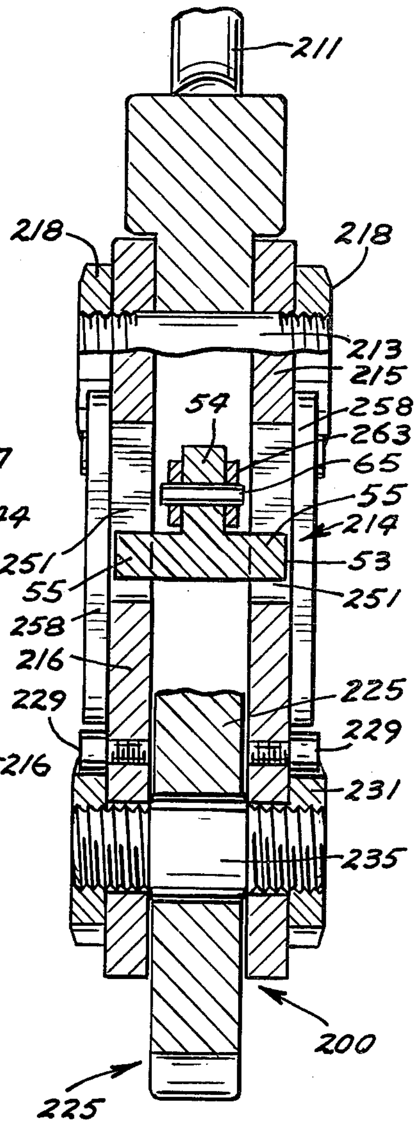
FIG. 17 is a vertical sectional view taken on line 17—17 in FIG. 16.
Figure 18:
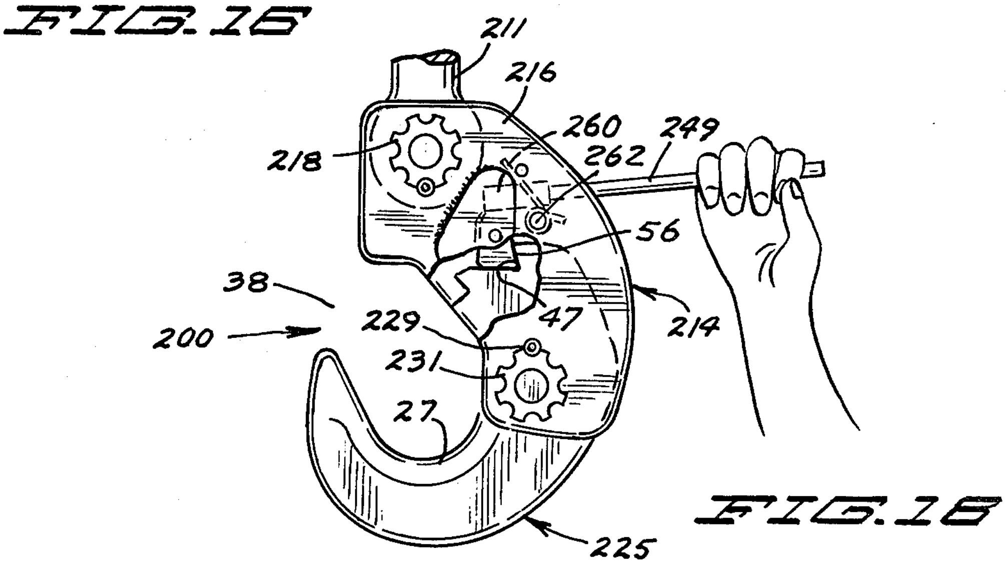
FIG. 18 is a reduced side elevational view of the hook assembly of FIG. 16 with the hook in open position and with an actuating bar situated to permit manual actuation of a releasable lock mechanism.

In FIGS. 16 through 18, a hook assembly 200 of a fourth embodiment of the invention includes a hook assembly frame 214 consisting of frame side plates 215 and 216 held together by an upper straight threaded pin or bolt 213 and nuts 218,218 at an upper portion thereof, and by a lower threaded shoulder pin 235 and nuts 231,231. Upper pin 213 also supports the shank of an eye attachment 211 between the side plates 215 and 216, and the nuts are turned up to fasten the side plates tightly against the shank.

Lower shoulder pin 235 pivotally supports an arcuate hook member 225, with the nuts 231 turned up tight against the shoulder of the shoulder pin to allow the hook member to pivot freely on the shoulder pin 235.

As seen in FIGS. 16 and 17, socket head cap screws 229 are employed to insure that nuts 218,218 and 231,231 cannot loosen.

Parts of hook assembly 200 which are identical with parts of hook assembly 10 are identically numbered. Among others, these parts include the load loop 12, tip 26 of hook member 225, curving load bearing body portion 27 of the hook member, open unobstructed throat 38, integral interior enlarged end portion 30 of hook member 225, first projection 44 on end portion 30 of hook member 225, second projection 45 on end portion 30, first shoulder 47 on first projection 44, second shoulder 48 on projection 45, ramp surface 59 provided on end portion 30 of hook member 225 between first shoulder 47 and second shoulder 48, and locking member 50.

A releasable lock mechanism 243 includes this locking member 50 slidably mounted in vertical slots 251,251 which are provided in side plates 215 and 216. Cover plates 258,258 are welded onto the frame side plates to cover these slots 251,251.

A lock mechanism shouldered pivot pin 262 is mounted in provided openings in these frame side plates 215 and 216, and rotatably supports a lever member 260 which is continuously urged by a torsion spring 292 to swing about pivot pin 262 in counterclockwise direction as seen in FIGS. 16 and 18.

Lever member 260 includes a rod socket 252 into which can be inserted a rod 249 for the purpose of moving the lever member 260 in clockwise direction in FIGS. 16 and 18 against the action of spring 292 in order to release the releasable lock mechanism 243 in a manner to be described.

Lever member 260 is also provided with a pair of parallel spaced apart slotted ears 263,263 each such ear being provided with a slot 264 therein.

Locking member 50 is made up of a transverse lock bar 53 having transverse ends 55,55 which actually slide in the slots 251,251. The lock bar is provided with a beveled bearing face 56, and a post 54 extends upwardly from the lock bar 53 to carry a transverse pin 65. This pin 65 slides in slots 264 of each of the ears 263,263 of the lever member 260.

In use, the action of the hook assembly 200 of the fourth embodiment of the invention will be very much like the action of the hook assembly in the second embodiment of the invention. With the parts positioned as seen in FIG. 18, a load such as load loop 12 will be inserted onto the hook member 225 and the hook member can be raised up to cause the transverse lock bar 53 to slide over the ramp surface 59 to take position as seen in FIG. 16, thus locking the hook assembly 200 in the closed position to prevent accidental escape of the load loop 12 from the closed eye.

When it is desired to move the hook assembly 200 to the open position, rod 249 will be inserted into rod socket 252, and this rod will be used to manually move the lever member 260 to lift the beveled bearing face 56 of the lock bar 53 into clearing relationship with respect to the second shoulder 48, thus allowing the hook to rotate to position seen in FIG. 18 with the beveled bearing surface 56 in contact with the first shoulder 47 of the integral interior enlarged end portion 30 of the hook member 225.

When it is desired to release the load entirely, the rod 249 will again be inserted, and the lever 260 will be further rotated about the shouldered pivot pin 262 to move the beveled bearing face 56 into clearing relation to first shoulder 47, thus allowing the hook member 225 to fall to a position such as shown for the hook member 25 in FIG. 7, or for the same hook member 25 in FIG. 15 in other embodiments, thus discharging the load.

In the foregoing embodiments of hook assemblies according to the present invention, the frames 14, 14A and 214 provide protection for the internal parts which are themselves rugged and not susceptible to malfunction or damage. Locking member 50 is the only element of the lock mechanism which must withstand the load on the hook member. Its size and strength are compatible with the load capacity of the hook member. For engagement and disengagement of a load, the throat opening provided by the hook assembly is unobstructed and anti-fouling. Operation of the hook assembly is simple. The hook assembly is adaptable to all sizes of working load ratings.

While there have been shown and described several embodiments of the invention, it will be apparent to those skilled in the art that further alterations could be made without departing from the scope and spirit of the appended claims.

The embodiments of the invention in which an exclusive property or privilege is claimed are defined as follows:

1. A hook assembly including:
- a frame;
- a generally arcuate hook member having a hook tip at one end;
- means pivotally assembling the hook member to the frame permitting rotation of the hook member with respect to the frame about a hook pivot axis between a closed position with the hook tip proximate a portion of the frame and forming with a portion of the frame a substantially closed, load retaining eye, and an open position for engagement of a load with said hook tip spaced from the frame portion to provide an unobstructed throat between said tip and said frame;
- releasable lock means on the frame to lock said hook member in the closed position;
- said releasable lock means including a locking member slideably assembled to the frame and fixed for guided movement relative thereto;
- said hook member having a shoulder engageable with said locking member;
- said lock means being positioned with respect to said frame for movement of said locking member into and out of locking engagement with the shoulder when the hook member is in the closed position;
- said locking member including a transverse lock bar having a plane bearing surface engageable with the shoulder, said lock bar being movable with said locking member to a position for engagement with said shoulder after the hook member has been moved to the closed position with said bearing surface in bearing relationship to said shoulder to prevent movement of the hook member toward the open position;
- actuator means to move the locking member out of locking engagement with the shoulder to permit rotation of the hook member toward the open position; and
- said frame including side plates, said side plates being provided with elongated, parallel and aligned, facing slots, said transverse lock bar of the locking member having transverse ends located in said slots for guided movement of the locking member by said slots and to bear against a part of the frame when the hook member is in the closed position.

2. The hook assembly of claim 1 wherein: actuating means includes a lever member, said lever member being pivotally assembled to the frame, one end of said lever member engaging said locking member, and including means for rotation of said lever member to effect movement of the locking member relative to the slots to move the locking member out of engagement with the shoulder.

3. The hook assembly of claim 2 wherein: said hook member has a ramp surface adjacent said shoulder; said lock bar being accomodated on said ramp surface when the hook member is in the open position; said lock bar positioned to slide over said ramp surface when the hook member is moved toward the closed position; said lock bar adapted to move from said ramp surface into position of engagement with said shoulder when the hook member reaches the closed position.

4. The hook assembly of claim 1 wherein: said plane bearing surface of said lock bar lies in a plane which passes said hook pivot axis at a side thereof opposite said hook tip when said lock bar bearing surface is engaged with said hook member shoulder.

5. The hook assembly of claim 1 wherein: said bearing surface of said lock bar is a planar surface positioned to receive a component of force acting in the direction of movement of the lock bar toward engagement with said shoulder whereby a loading on the hook member exerts a force component between the bearing surface and the shoulder acting in a direction of movement of the lock bar toward engagement with the second shoulder.

6. A hook assembly including:
- a frame;
- a generally arcuate hook member having a hook tip at one end;
- means pivotally assembling the hook member to the frame permitting rotation of the hook member with respect to the frame about a hook pivot axis between an open position for engagement of a load with said hook member and a discharge position wherein any load on said hook will be dropped therefrom;
- releasable lock means on the frame to lock said hook member in the open position;
- said releasable lock means including a locking member slideably assembled to the frame and fixed for guided movement relative thereto;
- said hook member having a shoulder engageable with said locking member;
- said lock means being positioned with respect to said frame for movement of said locking member into and out of locking engagement with the shoulder when the hook member is in the open position;
- said locking member including a transverse lock bar having a plane bearing surface engageable with the shoulder, said lock bar being movable with said locking member to a position for engagement with said shoulder after the hook member has been moved to the open position with said bearing surface in bearing relationship to said shoulder to prevent movement of the hook member toward the discharge position;
- actuator means to move the locking member out of locking engagement with the shoulder to permit rotation of the hook member toward the discharge position.

7. The hook assembly of claim 6 wherein: said frame includes side plates, said side plates provided with elongated, parallel, aligned, facing slots, said transverse lock bar of the locking member having transverse ends located in said slots for guided movement of the locking member by said slots and to bear against a part of the frame when the hook member is in the open position.

8. The hook assembly of claim 7 wherein: actuating means includes a lever member, said lever member being pivotally assembled to the frame, one end of said lever member engaging said locking member, and including means for rotation of said lever member to effect movement of the locking member relative to the slots to move the locking member out of engagement with the shoulder.

9. The hook assembly of claim 8 wherein: said hook member has a ramp surface adjacent said shoulder; said lock bar being adapted to slide over part of the ramp surface when the hook member is moved from the discharge position toward the open position; said lock bar being adapted to move from said ramp surface into position of engagement with said shoulder when the hook member reaches the open position.

10. The hook assembly of claim 6 wherein: said plane bearing surface of said lock bar lies in a plane which passes said hook pivot axis at a side thereof opposite side hook tip when said lock bar bearing surface is engaged with said hook member shoulder.

11. A hook assembly including:

a frame;

a generally arcuate hook member having a hook tip at one end;

means pivotally assembling the hook member to the frame permitting rotation of the hook member with respect to the frame about a hook pivot axis between a closed position with the hook tip proximate a portion of the frame and forming with a portion of the frame a substantially closed, load retaining eye, an open position for engagement of a load with said hook tip spaced from the frame portion to provide an unobstructed throat between said tip and said frame, and a discharge position wherein any load on said hook member will be dropped therefrom;

releasable lock means on the frame to lock the hook member in the closed position to hold the hook member from rotation toward the discharge position when in the open position and to move in clearing relation to the hook member to allow it to move toward the discharge position;

said releasable lock means including a locking member slideably assembled to the frame and fixed for guided movement relative thereto;

said hook member having a first shoulder and a second shoulder spaced from the first shoulder;

said lock means being positioned with respect to said frame for movement of said locking member into and out of locking engagement with the first shoulder when the hook member is in the open position, and for movement of said locking member into and out of locking engagement with the second shoulder when the hook member is in the closed position;

said locking member including a transverse lock bar having a plane bearing surface engageable with said shoulders, said lock bar being movable with said locking member to a position for engagement with said first shoulder when the hook member is in the open position with said bearing surface in bearing relationship to said first shoulder to prevent movement of the hook member toward the discharge position, said second shoulder being located for movement toward said lock bar upon movement of the hook member toward the closed position, said lock bar being movable to a position for engagement with said second shoulder after the hook member has been moved to the closed position with said bearing surface in bearing relationship to said second shoulder to prevent movement of the hook member toward the open position; and actuator means to move the locking element out of locking engagement with the second shoulder to permit rotation of the hook member toward the open position where the locking element will have engagement with the first shoulder and to move the locking element out of locking engagement with the first shoulder to permit rotation of the hook member toward said discharge position; said plane bearing surface of said lock bar lying in a plane which passes said hook pivot axis at a side thereof opposite said hook pivot axis when said lock bar bearing surface is engaged with said first shoulder and also when said lock bar bearing surface is engaged with said second shoulder.

12. The hook assembly of claim 11 wherein: said actuating means includes a lever member pivotally connected to the frame and having an end engaging said locking element for movement of the locking element upon rotation of the lever member, and including means for rotation of the lever member.

13. The hook assembly of claim 11 wherein: said frame includes parallel side plates having parallel, elongate, aligned slots; said transverse lock bar of the locking element having transverse ends located in said slots to bear against the frame; said slots providing said guided movement of the locking element into and out of engagement with the shoulders.

14. The hook assembly of claim 13 wherein: said shoulders are located on an interior end portion of the hook member normally disposed within the frame and opposite the hook tip, said shoulders being separated by a ramp surface; said slots being generally vertically disposed on said frame; said locking member being movable with respect to said slots to accomodate movement from a position in engagement with said first shoulder with the hook member in the open position, over said ramping surface upon movement of the hook member from the open position toward the closed position, to a position in engagement with the second shoulder when the hook member reaches the closed position.

15. The hook assembly of claim 14 wherein: said actuating means includes a lever member pivotally mounted on the frame; one end of said lever member being assembled to said locking member for moving of the locking member with respect to the slots upon movement of the one end of the lever member, and including means for movement of the one end of the lever member.

16. The hook assembly of claim 15 wherein: said means for movement of the one end of the lever member includes an integral handle on the other end of the lever member positioned to be engageable by an operator.

17. The hook assembly of claim 15 wherein: said locking member includes a post extended from said lock bar, and a transverse pin in said post; said one end of said lever member having bifurcations straddling said post; said bifurcations having end slots engaging said transverse pin to assemble the locking member for movement with said one end of the lever member.

18. The hook assembly of claim 17 wherein: said means for movement of the one end of the lever member includes a rod socket in said lever member, said socket being accessible to a rod manually engageable from outside said frame.

19. The hook assembly of claim 15 wherein: a handle is pivotally mounted to the frame proximate the lever member; latch means is pivotally connected to the handle; an abutment is provided on the frame in position to be releasably engageable by the latch means upon pivotal movement of the handle; bias means is disposed between the handle and the lever member to normally hold the latch means away from latching engagement with said abutment and is disposed to bias the one end of the lever member to a position to move the locking member to an upper position clear of said hook shoulders when the hook member is in the closed position carrying a load and the handle is pivoted to position the latch means in latching engagement with the abutment; the strength of the bias means being such that upon removal of the load from the hook member, the locking member is moved to an upper position to permit full rotation of the hook member to said discharge position.

20. The hook assembly of claim 19 wherein: said bias means includes an arm extended from said handle, an ear extending from said lever member, and a compression spring assembly disposed between said arm and said ear.

21. The hook assembly of claim 19 wherein: said locking element includes a post extended from said lock bar, and a transverse pin in said post; said one end of said lever member having bifurcations straddling said post; said bifurcations having end slots engaging said transverse pin to assemble the locking element for movement with said one end of the lever member.

22. The hook assembly of claim 15 wherein: said means for movement of the one end of the lever member includes a power unit assembled between the lever member and the frame.

23. The hook assembly of claim 22 wherein: said power unit is in the form of a linear motor.

24. The hook assembly of claim 22 wherein: said means for movement of the one end of the lever member also includes integral handle means disposed on said lever member.

25. The hook assembly of claim 22 wherein: said locking member is movable with respect to said slots to an upper position in said slots in clearing relationship to both shoulders to permit full rotation of said hook member to a discharge position; said power unit being adapted to move the one end of the lever member to move the locking member to said upper position.

* * * * *